(12) United States Patent
Clayton et al.

(10) Patent No.: US 11,436,058 B2
(45) Date of Patent: Sep. 6, 2022

(54) WORKLOAD BALANCING TO ACHIEVE A GLOBAL WORKLOAD BALANCE

(71) Applicant: International Business Machines Corporation, Armonk, NY (US)

(72) Inventors: Nicolas M. Clayton, Warrington (GB); Shan Fan, Shanghai (CN); Yongjie Gong, Shanghai (CN); Yang Liu, Shanghai (CN); Xue Qiang Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 15/354,091

(22) Filed: Nov. 17, 2016

(65) Prior Publication Data
US 2018/0136981 A1 May 17, 2018

(51) Int. Cl.
*G06F 9/50* (2006.01)

(52) U.S. Cl.
CPC ............ *G06F 9/5083* (2013.01); *G06F 9/505* (2013.01)

(58) Field of Classification Search
CPC .............................. G06F 9/5083; G06F 9/505
See application file for complete search history.

(56) References Cited

U.S. PATENT DOCUMENTS

| | | | |
|---|---|---|---|
| 6,711,649 B1 | 3/2004 | Bachmat et al. | |
| 6,718,434 B2 * | 4/2004 | Veitch | G06F 3/0605 711/114 |
| 7,760,641 B2 * | 7/2010 | Gilfix | H04L 47/10 370/235 |
| 7,886,299 B2 | 2/2011 | Kitamura | |
| 7,917,705 B2 | 3/2011 | Bamba et al. | |
| 8,688,831 B2 | 4/2014 | Schnier | |
| 9,223,630 B2 * | 12/2015 | Song | G06F 9/505 |

(Continued)

OTHER PUBLICATIONS

US 8,458,123 B2, 06/2013, Rishel et al. (withdrawn)

(Continued)

*Primary Examiner* — Michael W Ayers
(74) *Attorney, Agent, or Firm* — Nelson IP; Daniel P. Nelson

(57) ABSTRACT

Embodiments of the present disclosure relate to a new approach for workload balancing in a system. A computer-implemented method comprises obtaining a configuration of a system, wherein the configuration includes a connection relationship between components in the system. The method further comprises determining a workload threshold of a given component in the components based on the configuration, wherein a workload threshold of an upstream component of the given component is associated with a workload limit of the upstream component and a workload limit of the given component. The method further comprises determining a utilization rate of the given component based at least partially on a workload amount of the given component, the workload threshold of the given component, and the workload threshold of the upstream component. Accordingly, a more accurate utilization rate of each component in a system can be determined by considering the bottleneck of other components in the system, and thus workloads of various components in the system can be balanced from the perspective of the overall system.

20 Claims, 13 Drawing Sheets

(56) References Cited

U.S. PATENT DOCUMENTS

| | | | | |
|---|---|---|---|---|
| 2002/0091746 A1* | 7/2002 | Umberger | ............ | G06F 3/0613 |
| | | | | 718/105 |
| 2006/0020691 A1 | 1/2006 | Patterson et al. | | |
| 2010/0153966 A1* | 6/2010 | Arimilli | ................ | G06F 9/4856 |
| | | | | 718/105 |
| 2010/0186019 A1* | 7/2010 | Branson | ................ | G06F 9/5011 |
| | | | | 718/104 |
| 2011/0283123 A1* | 11/2011 | Shigemura | ............ | G06F 1/3221 |
| | | | | 713/320 |
| 2012/0102187 A1 | 4/2012 | Bargoti et al. | | |
| 2013/0326064 A1* | 12/2013 | Gulati | .................. | G06F 9/5061 |
| | | | | 709/226 |
| 2016/0087899 A1* | 3/2016 | Katevenis | ............... | H04L 47/22 |
| | | | | 370/230 |

OTHER PUBLICATIONS

Mesbahi, Mohammadreza, et al. "Load Balancing in Cloud Computing: A State of the Art Survey," I.J. Modem Education and Computer Science, vol. 3, pp. 64-78, Published Online Mar. 2016 in MECS (http://www.mecs-press.org/).

* cited by examiner

WORKLOAD BALANCING TO ACHIEVE A GLOBAL WORKLOAD BALANCE

BACKGROUND

In a computing system such as a storage system or a communication system, there are a plurality of hardware or software components. When one or more components in the computing system process too many workloads while other components process fewer workloads, a workload imbalance problem is arising in the computing system. Accordingly, the computing system will have a bad performance due to the workload imbalance.

To maximum the overall performance of the computing system, it is necessary to achieve the workload balance among components in the computing system. Traditional, utilization rates of various components in the computing system are calculated in order to measure whether the workload is balanced, wherein the utilization rate is a ratio of a workload amount and a workload limit. If there are some differences among the utilization rates of the same type of components, it means that the computing system has a workload imbalance problem. Then, the workloads are migrated or redistributed among those components in order to achieve the workload balance in the computing system.

SUMMARY

Example embodiments of the present disclosure provide a new approach for workload balancing in a system.

In an aspect, a device is provided. The device includes a processing unit and a memory coupled to the processing unit and storing instructions thereon. The instructions may be executed by the processing unit to perform acts including: obtaining a configuration of a system, wherein the configuration includes a connection relationship between components in the system; determining a workload threshold of a given component in the components and a workload threshold of an upstream component of the given component based on the configuration, wherein the workload threshold of the upstream component is at least associated with a workload limit of the upstream component and a workload limit of the given component; and determining a utilization rate of the given component based at least partially on a workload amount of the given component, the workload threshold of the given component, and the workload threshold of the upstream component.

In another aspect, a computer-implemented method is provided. The method comprises: obtaining a configuration of a system, wherein the configuration includes a connection relationship between components in the system; determining a workload threshold of a given component in the components and a workload threshold of an upstream component of the given component based on the configuration, wherein the workload threshold of the upstream component is at least associated with a workload limit of the upstream component and a workload limit of the given component; and determining a utilization rate of the given component based at least partially on a workload amount of the given component, the workload threshold of the given component, and the workload threshold of the upstream component.

In yet another aspect, a computer program product is provided. The computer program product is tangibly stored on a non-transient machine-readable medium and comprises machine-executable instructions. The instructions, when executed on a device, cause the device to: obtain a configuration of a system, wherein the configuration includes a connection relationship between components in the system; determine a workload threshold of a given component in the components and a workload threshold of an upstream component of the given component based on the configuration, wherein the workload threshold of the upstream component is at least associated with a workload limit of the upstream component and a workload limit of the given component; and determine a utilization rate of the given component based at least partially on a workload amount of the given component, the workload threshold of the given component, and the workload threshold of the upstream component.

According to embodiments of the present disclosure, a more accurate utilization rate of each component in a system can be determined by considering the bottleneck of other components in the system, and thus workloads of various components in the system can be balanced from the perspective of the overall system. That is, no single component will become overloaded if the system does not overload as a whole. Moreover, the determined utilization rates can be compared among different types of components, and the workload amount of each component can be adjusted such that the system achieves a global workload balance. Further, in the case that the total workload amount of the system is changed, the workload amount of each component may be adjusted automatically while still maintaining the workload balance of the system.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

As used herein, the term "includes" and its variants are to be read as open terms that mean "includes, but is not limited to". The term "a" is to be read as "one or more" unless otherwise specified. The term "based on" is to be read as "based at least in part on". The term "one embodiment" and "an embodiment" are to be read as "at least one embodiment." The term "another embodiment" is to be read as "at least one other embodiment".

As used herein, the term "component" refers to any hardware, software module, or a combination thereof, which implements the functionality described in conjunction therewith using any solution. As used herein, the term "upstream component" refers to a component transferring a workload that is fed to a "downstream component", and the "downstream component" is the component receiving the workload from the "upstream component". Other definitions, explicit and implicit may be included below.

Figure 1:
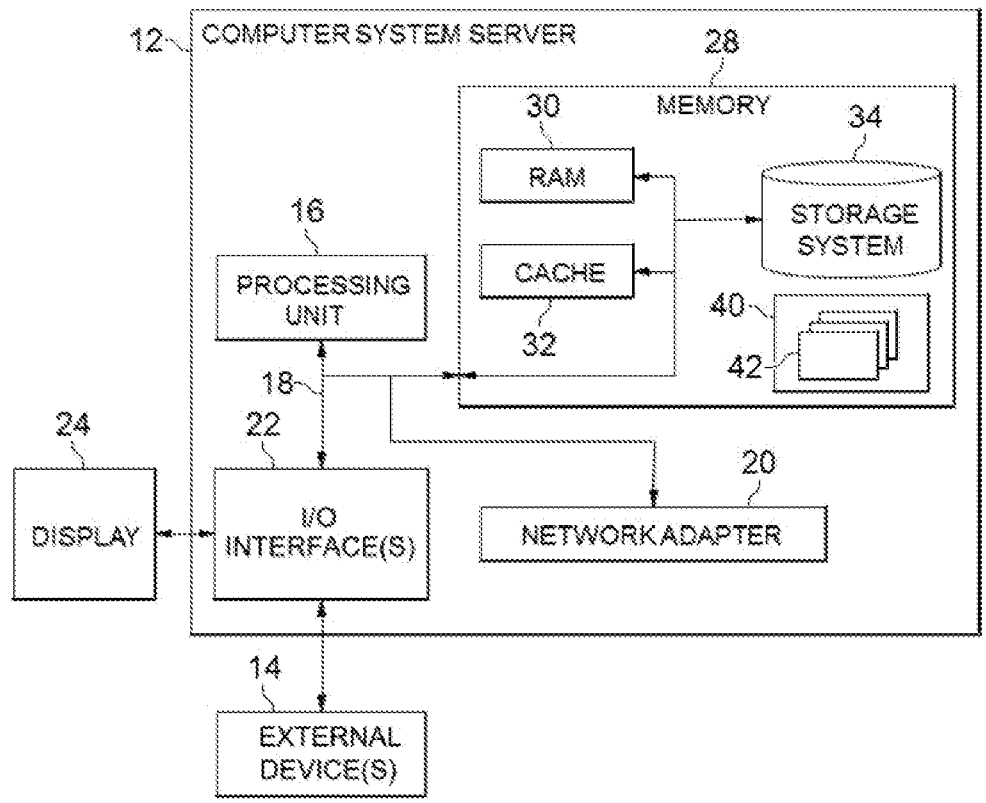
FIG. 1 is a block diagram of a computer system/server suitable for implementing embodiments of the present disclosure.

Reference is first made to FIG. 1, in which an exemplary computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Conventionally, a utilization rate is used to measure whether a system is workload balanced, and the traditional ways treat a ratio between the workload amount and the workload limit as the utilization rate. In such case, workloads will be migrated from the components having a higher utilization rate to the components having a lower utilization rate in order to achieve the workload balance. However, in a workload path, there are usually two or more components. If one device in the workload path becomes overloaded, the utilization rate of another device in the workload path cannot be used to indicate the actual utilization rate from the perspective of the overall system. That is, if an upstream component (for example, at a higher level) or a downstream component (for example, at a lower level) of a given component overloads and becomes the bottleneck, then the given component cannot maximum its own workload amount, and thus the workload amount of the given component cannot reach workload limit thereof. Accordingly, traditional workload balancing method cannot achieve the workload balance of the overall system without considering the workload limits of other components in the system.

In order to at least partially solve the above and other potential problems, a new approach for workload balancing in a system are provided herein. According to embodiments of the present disclosure, a more accurate utilization rate of each component in the system can be determined by considering the bottleneck of other components in the system, and thus workloads of various components in the system can be balanced from the perspective of the overall system. Moreover, the determined utilization rates can be compared among different types of components, and the workload amount of each component can be adjusted such that the system achieves a global workload balance.

Figure 2:
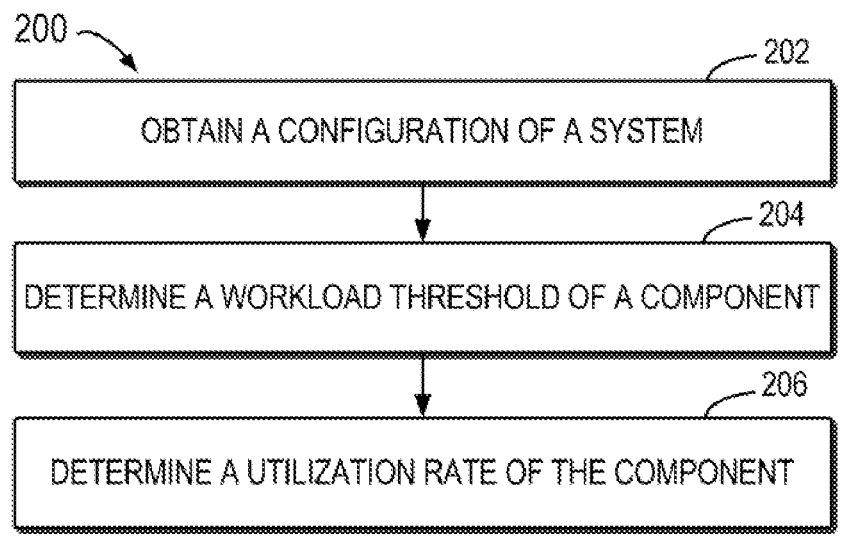
FIG. 2 is a flowchart of a method for determining a utilization rate of a component in accordance with embodiments of the present disclosure.

FIG. 2 is a flowchart of a method 200 for determining a utilization rate of a component in accordance with embodiments of the present disclosure, wherein the component may be a hardware module, a software module, or a combination thereof. In some embodiments, the workload may represent input/output operations per second (IOPS), bandwidth, or disk capacity and so on. Although IOPS in a storage system is used to be an example thereinafter, it should to be understood that embodiments of the present disclosure may be applicable to any workload in any system.

At 202, a configuration of a system is obtained. The configuration includes a connection relationship between components in the system. In some embodiments, the configuration may include a hierarchical structure of the system, and relative level relationship between components in the system may be extracted from the hierarchical structure. For example, the configuration may indicate that component A is an adjacent upstream component of component B and that component A is an adjacent upstream component of component C.

At 204, a workload threshold of a component is determined based at least on the configuration. For example, the workload threshold of each component in the system is determined based on the configuration and workload limit of each component, and the workload threshold of each component is not only associated with a workload limit of the component per se, but is also associated with a workload limit of a downstream component. As used herein, the workload limit represents a maximum workload amount of a component from the perspective of the component per se, and it is actually a local workload limit. According to embodiments of the present disclosure, a workload threshold of a component is determined by considering the workload limit(s) of the downstream component(s) thereof. Thus, the workload threshold is a workload limit of a component from the perspective of the overall system, and it may be also called as a global workload limit. Example embodiments of determining the workload threshold will be described below with reference to FIG. 4A.

At 206, a utilization rate of the component is determined based at least partially on a workload amount of the component, the workload threshold of the component, and the workload threshold of the upstream component. That is, the utilization rate of the component is determined by considering the workload threshold(s) of an upstream component(s) thereof. According to embodiments of the present disclosure, the utilization rate is a utilization of a component that may be used to measure the balance from the perspective of the overall system, and thus it may be also called as a global utilization rate. Example embodiments of determining the global utilization rate will be described below with reference to FIG. 6A.

According to the method 200 of the present disclosure, a more accurate utilization rate of each component in the system can be determined by considering the bottleneck of other components in the system, and thus workloads of various components in the system can be balanced from the perspective of the overall system.

Figure 3A:
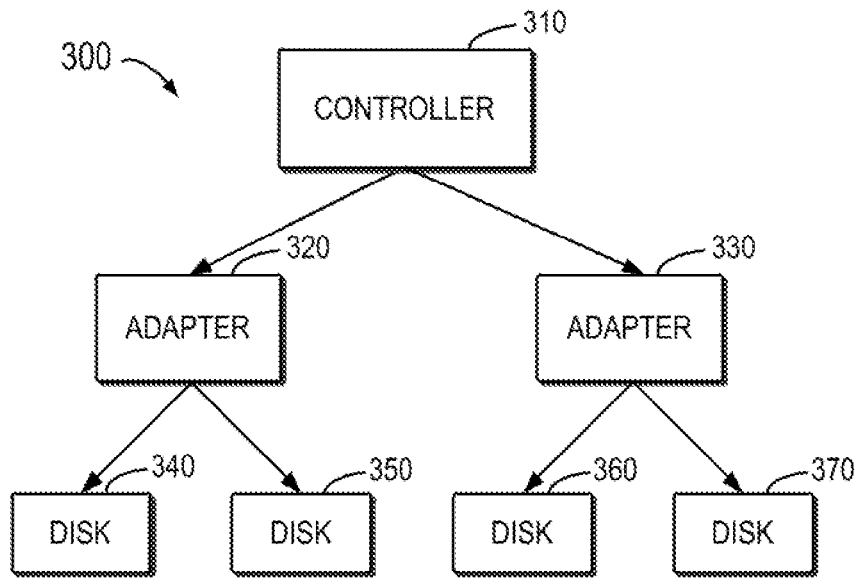
FIG. 3A is a schematic diagram illustrating a tree for a storage system in accordance with embodiments of the present disclosure.

FIG. 3A is a schematic diagram illustrating a tree for a storage system 300 in accordance with embodiments of the present disclosure. It is to be understood that although a tree is shown as a hierarchical structure, other types of hierarchical structures are also possible.

As shown in FIG. 3A, the storage system 300 includes one controller such as controller 310, two adapters such as adapters 320 and 330, and four disks such as disks 340, 350, 360, and 370. For example, the adapter 320 is a downstream component of the controller 310, and the adapter 320 is an upstream component of the disk 340. In the tree, a given node represents the given component, a parent node of the given node represents the upstream component of the given component, and a child node of the given node represents a downstream component of the given component. As shown, the controller 310 is regarded as a root node, and the adapters 320 and 330 which are regarded as child nodes of the controller 310 are non-leaf nodes, and the disks 340, 350, 360, and 370 are regarded as leaf nodes. In some embodiments, the configuration of the storage system 300 may be obtained from the tree after building a tree for the storage system 300.

Figure 3B:
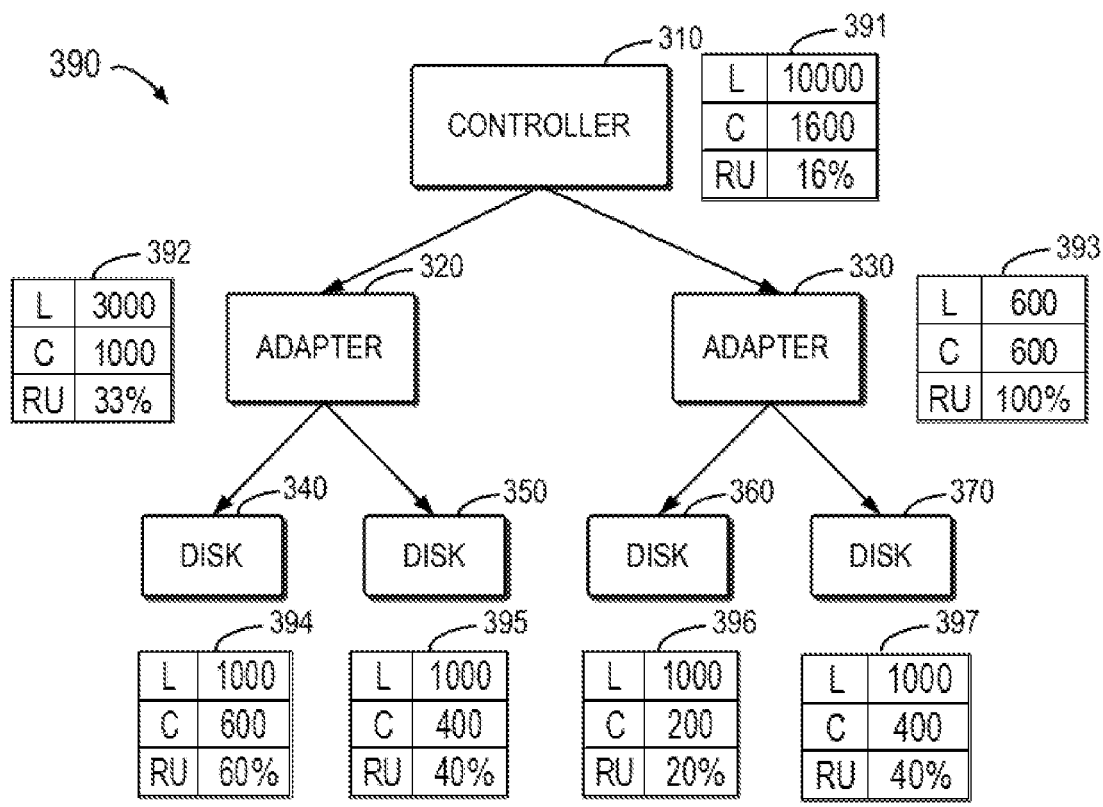
FIG. 3B is a schematic diagram illustrating a workload limit, a workload amount and a raw utilization rate of each node in the example storage system in accordance with embodiments of the present disclosure.

FIG. 3B is a schematic diagram 390 illustrating a workload limit, a workload amount and a raw utilization rate of each node in the example storage system 300 in accordance with embodiments of the present disclosure. As shown, tables 391-397 show the workload limit (referred to simply as "L"), the workload amount (that is the current workload amount, referred to simply as "C") and the raw utilization rate (referred to simply as "RU") of components 310-370 respectively in a certain situation.

For example, as shown in table 394 in FIG. 3B, the workload limit of the disk 340 is 1000 IOPS, and the workload amount of the disk 340 is 600 IOPS, and thus the raw utilization rate of the disk 340, which is a ratio between the workload amount and the workload limit, may be determined as 60%. As shown in table 392, the workload limit of the adapter 320 is 3000 IOPS, and the workload amount of the adapter 320 is 1000 IOPS, which is a sum of the workload amount (that is 600 IOPS) of the disk 340 and the workload amount (that is 400 IOPS) of the disk 350. Thus, the raw utilization rate of the adapter 320 may be determined as 33%. As shown in table 391, the workload limit of the controller 310 is 10000 IOPS, and the workload amount of the controller 310 is 1600 IOPS, which is a sum of the workload amount (that is 1000 IOPS) of the adapter 320 and the workload amount (that is 600 IOPS) of the adapter 330.

Figure 4A:
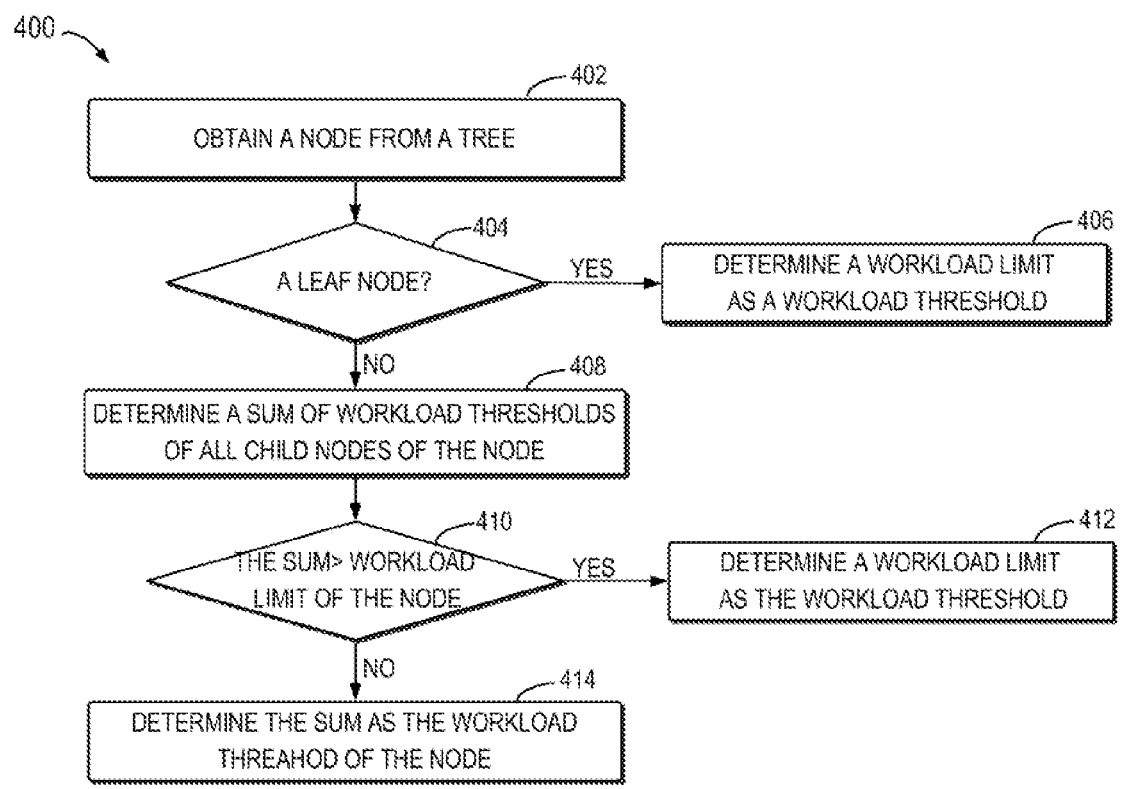
FIG. 4A is a flowchart of a method for determining a workload threshold in accordance with embodiments of the present disclosure.

As described above, a workload threshold is a workload limit of a component from the perspective of the overall system, and thus it may be also called as a global workload limit (referred to simply as "GL"). FIG. 4A is a flowchart of a method 400 for determining a workload threshold in accordance with embodiments of the present disclosure. It will be understood that the method 400 may be regarded as a specific implementation of step 204 in the method 200 with respect to FIG. 2.

At 402, a node is obtained from the tree. Generally, the node at a lower level is traversed first, because a workload threshold of a node at a higher level is determined based on that of a node(s) at a lower level. At 404, it is determined whether the obtained node is a leaf node. If so, at 406, a workload limit of the leaf node is determined as a workload threshold of the leaf node. Otherwise, it is determined that the node is a non-leaf node, and a sum of workload thresholds of all child nodes of the non-leaf node is determined at 408. Next, at 410, it is determined that whether the sum is greater than the workload limit of the non-leaf node. If so, at 412, a workload limit of the non-leaf node is determined as a workload threshold of the non-leaf node. Otherwise, at 414, the sum is determined as the workload threshold of the non-leaf node. That is, a smaller value of a workload limit of the non-leaf node and a sum of workload thresholds of all child nodes is determined as a workload threshold of the non-leaf node.

Figure 4B:
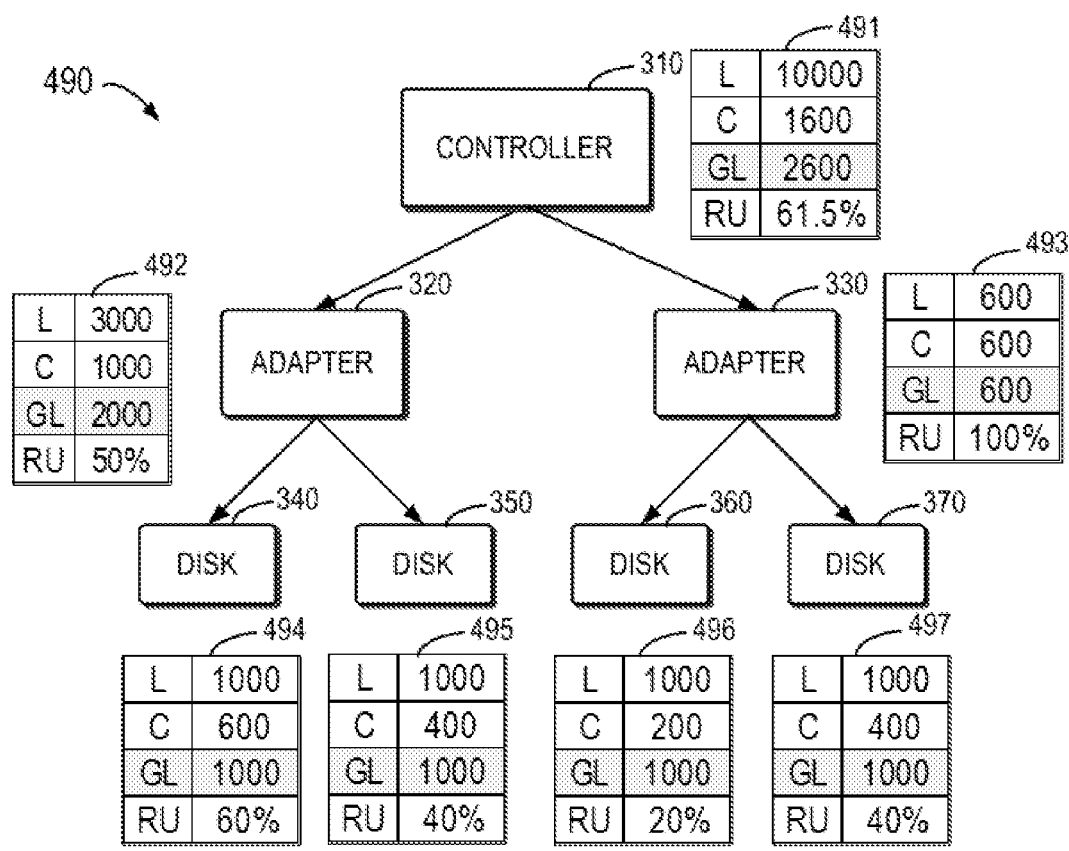
FIG. 4B is a schematic diagram further illustrating a workload threshold of each node in the example storage system in accordance with embodiments of the present disclosure.

For example, FIG. 4B is a schematic diagram 490 further illustrating a workload threshold ("GL") of each node in the example storage system 300 in accordance with embodiments of the present disclosure. According to the method 400 of the present disclosure, for a leaf node, the workload threshold of the leaf node is the workload limit thereof. As shown in tables 491-497 showing the workload thresholds of components 310-370 respectively, the workload thresholds of disks 340-370 are all 1000 IOPS, which are equal to the workload limits thereof.

According to the method 400 of the present disclosure, for a non-leaf node, a minimum value of a workload limit of the non-leaf node and a sum of workload thresholds of all child nodes is determined as a workload threshold of the non-leaf node. Since a workload threshold of the adapter 320 is 3000 IOPS, which is greater than the sum (that is 2000 IOPS) of workload thresholds of the disks 340 and 350. It means that the adapter 320 will never reach its workload limit, and thus the workload threshold of the adapter 320 is determined as 2000 IOPS. Moreover, the workload limit of the adapter 330 is merely 600 IOPS, which is lower than the sum (that is 2000 IOPS) of workload thresholds of the disks 360 and 370, and thus the workload threshold of the adapter 330 is determined as 600 IOPS. Further, the workload limit of the controller is 10000 IOPS, which is greater than the sum (that is 2600 IOPS) of workload thresholds of the adapters 320 and 330, and thus the workload threshold of the controller is determined as 2600 IOPS.

Moreover, the raw utilization rate (referred to simply as "RU") is defined to be a ratio between a workload amount and its workload threshold. Thus, as shown in FIG. 4B, the raw utilization rate of each node is updated since the corresponding workload threshold changes. For example, as shown in table 492, the raw utilization rate of the adapter 320 is updated from 33% to 50%.

Figure 5A:
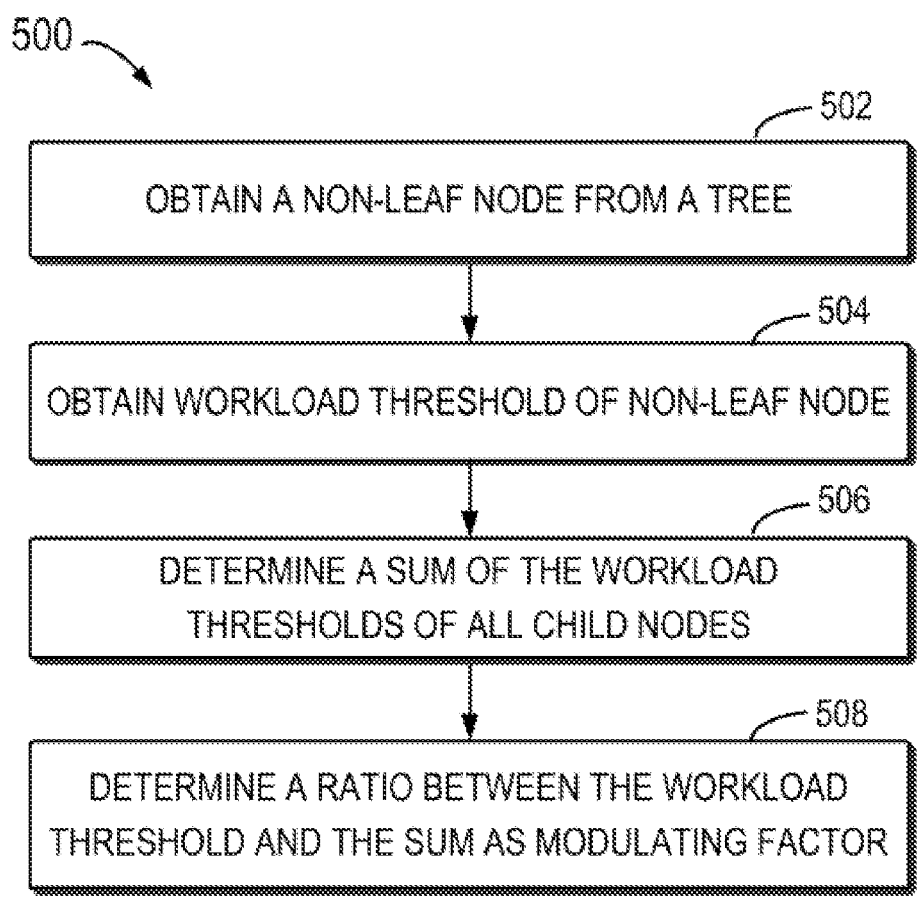
FIG. 5A is a flowchart of a method for determining a modulating factor in accordance with embodiments of the present disclosure.

FIG. 5A is a flowchart of a method 500 for determining a modulating factor (referred to simply as "MF") in accordance with embodiments of the present disclosure, and the modulating factor represents a degree that the workload threshold of the parent node impacts on the utilization rate of the given node. In some embodiments, the modulating factor may be used to convert a raw utilization rate to a global utilization rate. It will be understood that the method 500 may be regarded as a specific implementation of step 206 in the method 200 with respect to FIG. 2.

At 502, a non-leaf node is obtained from a tree after determining the workload thresholds. Since there is no child node for a leaf node, the leaf node does not have a characteristic of modulating factor. At 504, a workload threshold of the non-leaf node is obtained, and at 506 a sum of the workload thresholds of all child nodes of the non-leaf node is determined. Next, at 508, a ratio between the workload threshold of the non-leaf node and the determined sum is determined as the modulating factor of the non-leaf node.

Figure 5B:
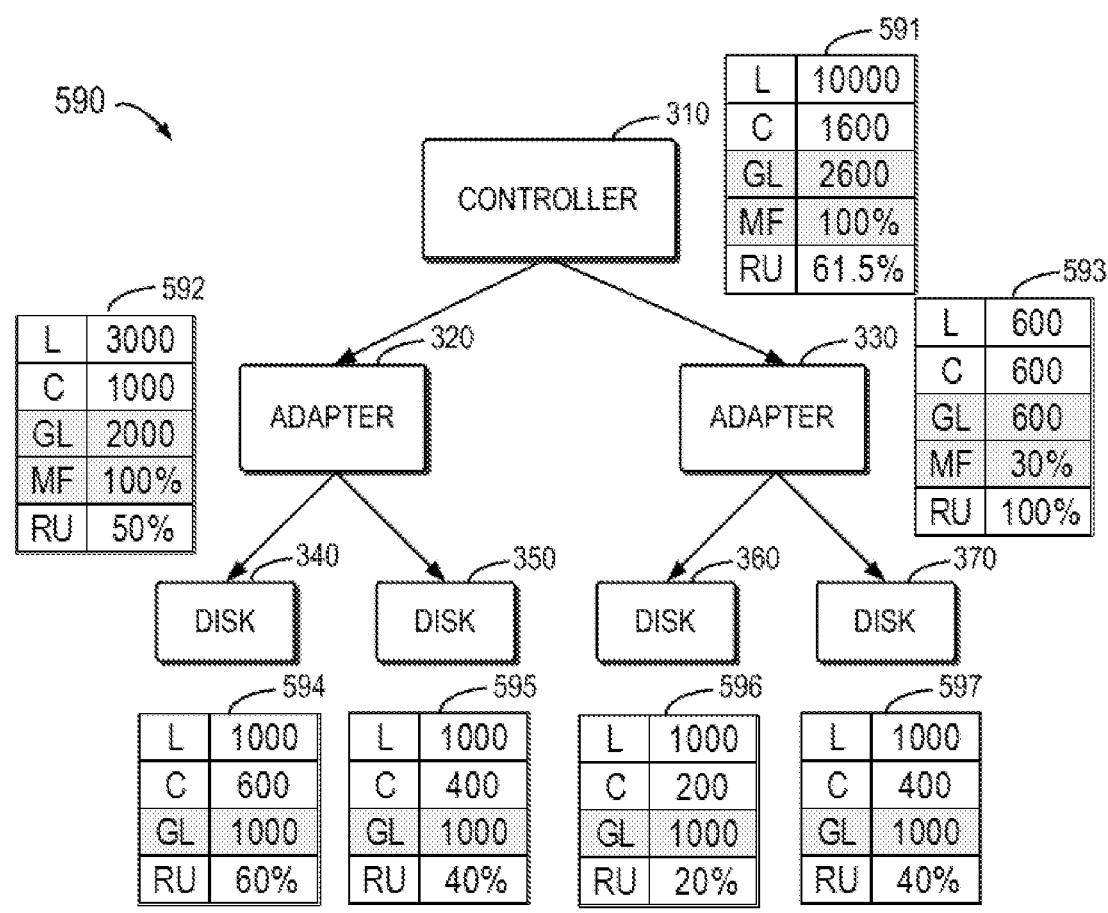
FIG. 5B is a schematic diagram further illustrating a modulating factor of each non-leaf node in the example storage system in accordance with embodiments of the present disclosure.

For example, FIG. 5B is a schematic diagram 590 further illustrating a modulating factor of non-leaf node in the example storage system 300 in accordance with embodiments of the present disclosure. Since there is no child node for the disks 340-370, the disks 340-370 do not have a characteristic of modulating factor. As shown in FIG. 5B, tables 591-597 show the profiles of components 310-370 respectively.

According to the method 500 of the present disclosure, the modulating factor ("MF") of the adapter 320 equals to a ratio between the workload threshold (that is 2000 IOPS) of the adapter 320 and the sum (that is 2000 IOPS) of workload thresholds of the disks 340 and 350, which is determined as 100%. Moreover, the modulating factor of the adapter 330 equals to a ratio between the workload threshold (that is 600 IOPS) of the adapter 330 and the sum (that is 2000 IOPS) of workload thresholds of the disks 360 and 370, which is determined as 30%. Further, the modulating factor of the controller 310 equals to a ratio between the workload threshold (that is 2600 IOPS) of the controller 310 and the sum (that is 2600 IOPS) of workload thresholds of the adapters 320 and 330, which is determined as 100%.

It is to be understood that although step 504 is shown prior to step 506, this is merely for the purpose of illustration without suggesting any limitation as to the scope of the present disclosure. In some embodiments, these two steps can be carried out in parallel. That is, it is possible to use a single instruction to the workload threshold of the non-leaf node and the sum of the workload thresholds of all child nodes of the non-leaf node.

Figure 6A:
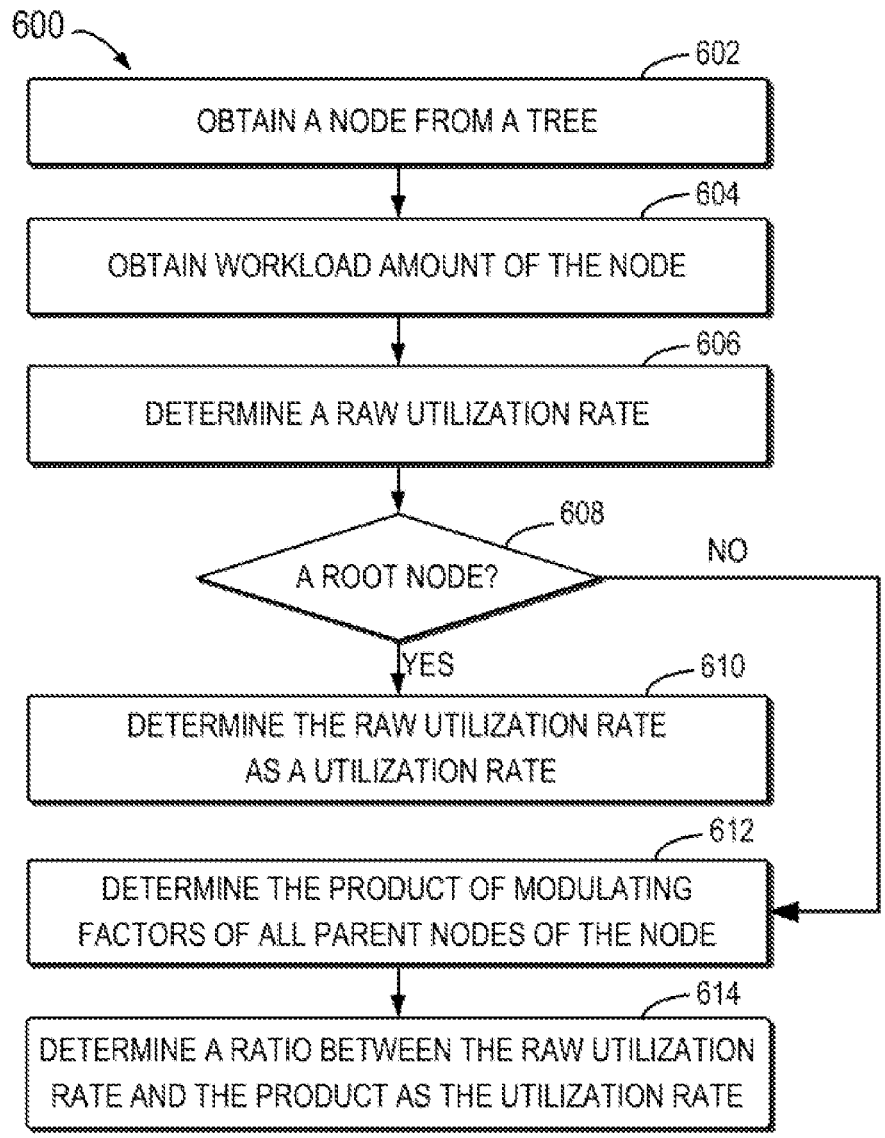
FIG. 6A is a flowchart of a method for determining a utilization rate in accordance with embodiments of the present disclosure.

As described above, the utilization rate is a utilization of a component that may be used to measure the balance from the perspective of the overall system, and thus it may be also called as a global utilization rate (referred to simply as "GU"). FIG. 6A is a flowchart of a method 600 for determining a global utilization rate in accordance with embodiments of the present disclosure. It will be understood that the method 600 may be regarded as a specific implementation of step 206 in the method 200 with respect to FIG. 2.

At 602, a node is obtained from the tree after determining the modulating factors in step 508 with respect to FIG. 5A. At 604, a workload amount of the node is obtained from for example a database or a management system. At 606, a ratio between the workload amount and the workload threshold is determined as a raw utilization rate of the node.

At 608, it is determined whether the node is root node. If so, the raw utilization rate is determined as a global utilization rate, because the root node does not have a parent node which has an impact thereon regarding the utilization rate. Otherwise, at 612, the product of modulating factors of all parent nodes of the node is determined. Then, at 614, a ratio between the raw utilization rate of the node and the product is determined as the global utilization rate of the node. Accordingly, components at different level in the system can be compared without distinction by use of the utilization rate, which provides an intuitive way to detect the overload or imbalance in the system.

Figure 6B:
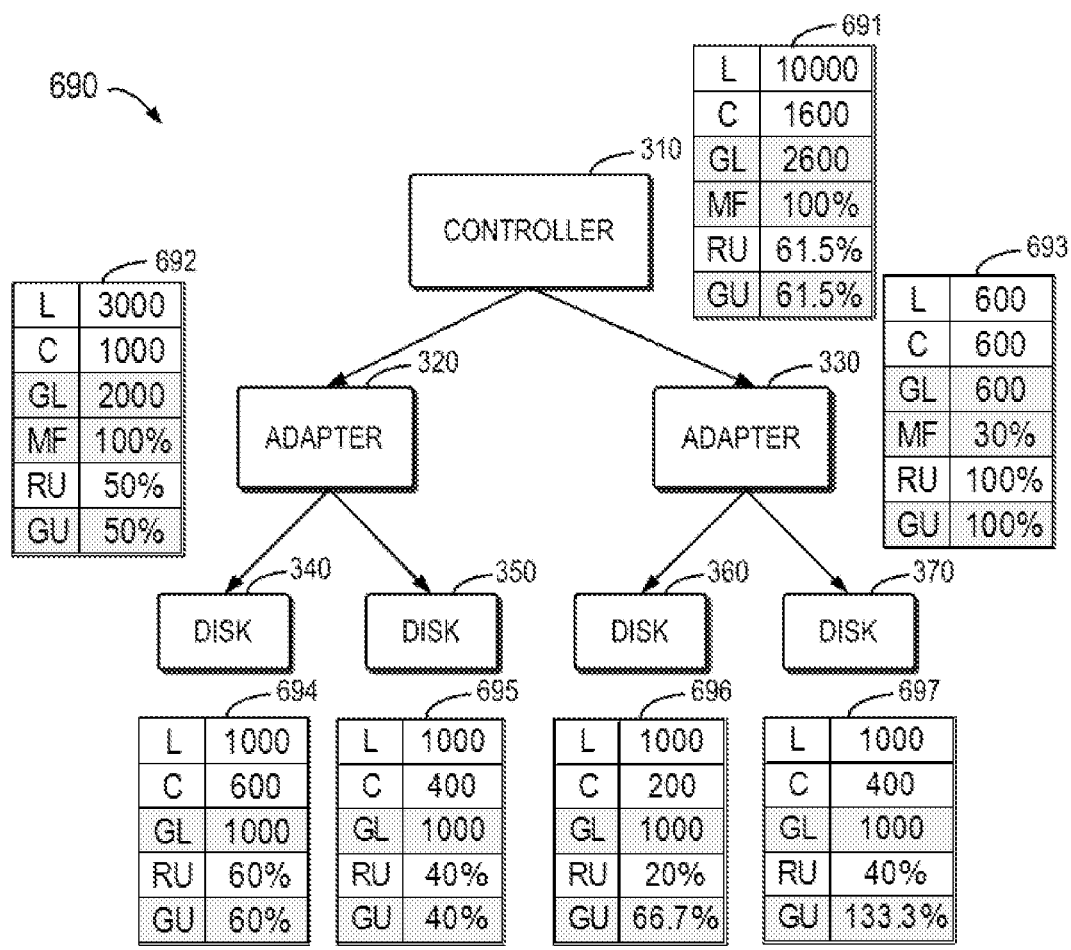
FIG. 6B is a schematic diagram further illustrating a utilization rate of each node in the example storage system in accordance with embodiments of the present disclosure.

For example, FIG. 6B is a schematic diagram 690 further illustrating a utilization rate ("GU") for each node in the example storage system 300 in accordance with embodiments of the present disclosure. According to the method 600 of the present disclosure, the raw utilization rate ("RU") of each node is determined first, and then the utilization rate ("GU") for each node is determined based on the raw utilization rate of the node and the product of modulating factors of all parent nodes of the node. As shown in FIG. 6B, tables 691-697 show the profiles of components 310-370 respectively.

As the controller 310 does not have any parent node, the raw utilization rate of the controller 310 is determined as the utilization rate ("GU"), with a value of 61.5%. For example, as shown in table 692, the utilization rate of the adapter 320 is determined as a ratio between the raw utilization rate ("RU") of the adapter 320 and the modulating factor of the controller 310, with a value of 50%. For another example, as shown in table 697, the utilization rate of the disk 370 is determined as a ratio between the raw utilization rate of the disk 370 and the product that multiplies the modulating factor of the adapter 330 by the modulating factor of the controller 310, with a value of 133.3%.

As seen from the utilization rates ("GU") in tables 691-697 in FIG. 6B, the disk 370 has actually overloaded since its utilization rate is greater than 100%. Accordingly, the adapter 330 and the controller 110 will be affected due to the bottleneck of the disk 370, and the storage system 300 cannot work normally. Thus, some workloads need to be migrated among these components in order to realize workload balance in the storage system 300. Thus, by determining a utilization rate of each node, it may be determined whether the workloads are balanced among all nodes in the system.

Figure 7A:
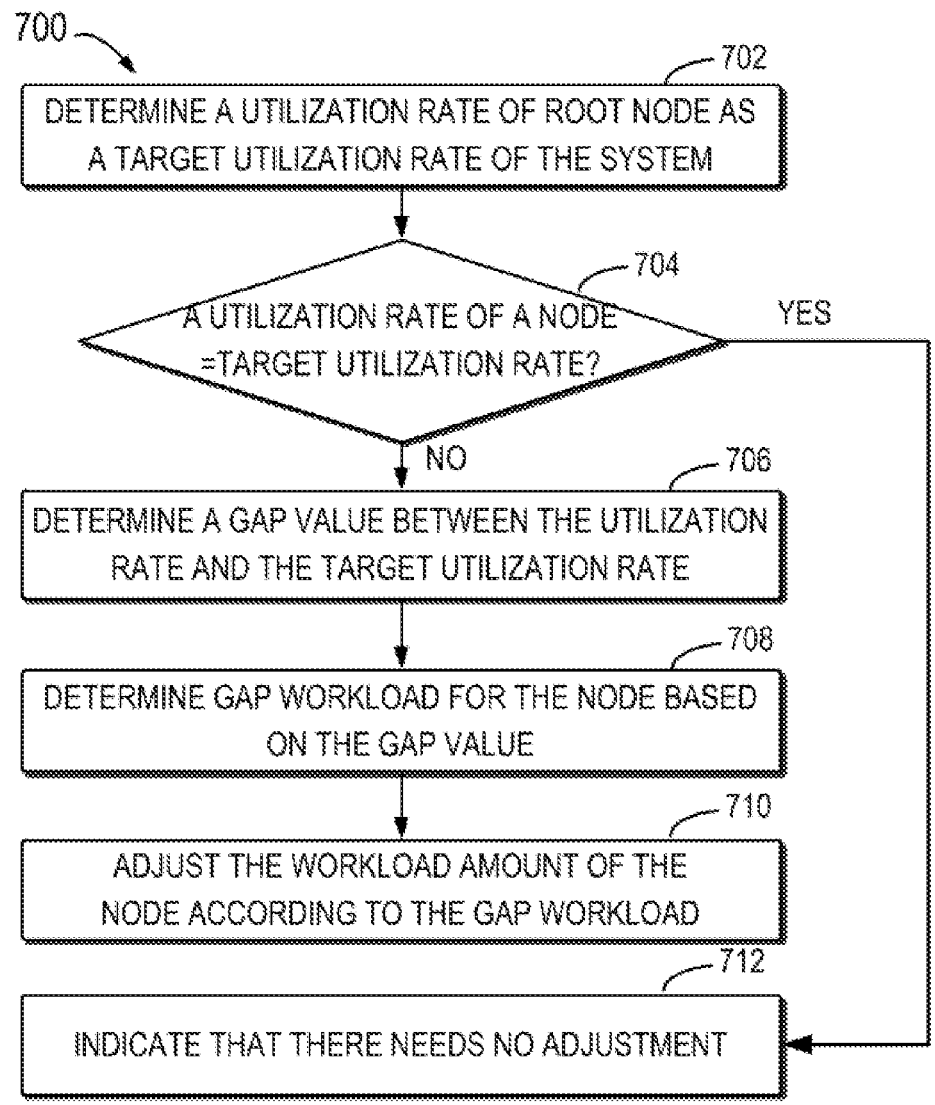
FIG. 7A is a flowchart of a method for balancing workload in a system in accordance with embodiments of the present disclosure.

FIG. 7A is a flowchart of a method 700 for balancing workload in a system in accordance with embodiments of the present disclosure. It will be understood that the method 700 may start after determining the utilization rate of each component in step 206 in the method 200 with respect to FIG. 2 or the step 614 in the method 600 with respect to FIG. 6A. At 702, a utilization rate of the root node (for example the controller 310) is determined as a target utilization rate of the system. If the target utilization rate is less than 100%, it means the system have the ability to carry more workloads after workload balancing without reaching the workload limit of any node in the system. At 704, it is determined whether a utilization rate of a given node is equal to the target utilization rate.

If the utilization rate of the given node is different from the target utilization rate, at 706, a gap value between the utilization rate and the target utilization rate is determined. Next, at 708, a gap workload of the given node is determined based on the gap value, and at 710, the workload amount of the given node is adjusted according to the gap workload. If the utilization rate of the given node is equal to the target utilization rate, then at 712, it means that there needs no adjustment for the workload amount of the given node. Accordingly, by determining a utilization rate of each node and the target utilization rate of the system, some workload adjustments may be made in order to achieve the workload balance in the storage system 300.

Figure 7B:
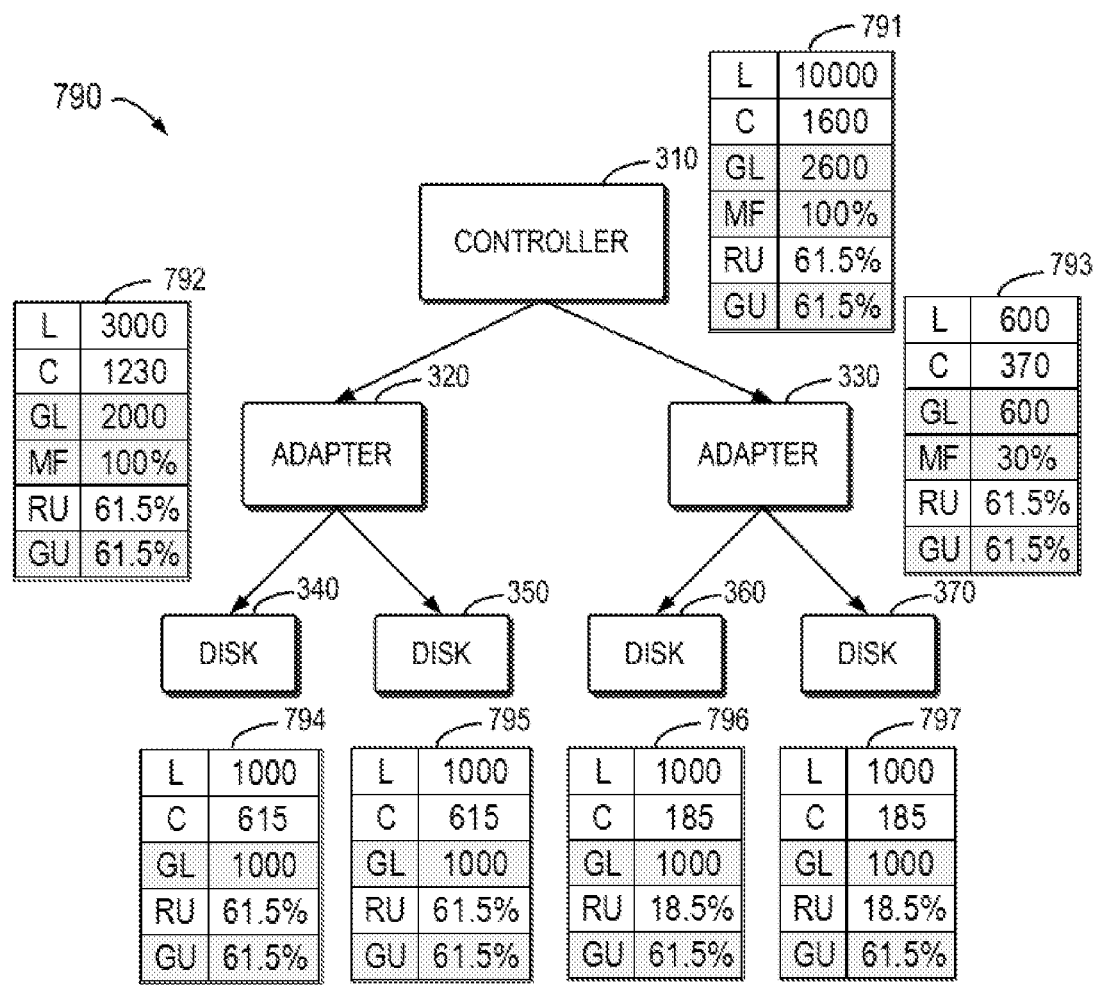
FIG. 7B is a schematic diagram illustrating the updated utilization rate of each node after workload balancing in the example storage system in accordance with embodiments of the present disclosure.

FIG. 7B is a schematic diagram 790 further illustrating the updated utilization rate of each node after workload balancing in accordance with embodiments of the present disclosure, wherein tables 791-797 show the profiles of components 310-370 respectively. The target utilization rate (referred to simply as "TU") is defined to the raw utilization rate of the controller 310, with a value of 61.5%. Then, the gap workload for each component may be determined based on its utilization rate and target utilization rate, and the workload amount of each node may be adjusted according to the gap workload so as to achieve workload balance in the system 300. For example, the gap workload $W_{gap}$ of a node may be determined as below.

$$W_{gap} = U_{gap} * GL * MF_{all} \quad (1)$$

where $U_{gap}$ denotes a difference value between the target utilization rate of the system and the utilization rate of the node, and GL denotes a workload threshold of the node, $MF_{all}$ denotes the product of modulating factors ("MF") of all parent nodes of the node. Thus, the workload balance of the system can be achieved by adjusting workload and one-time calculation. For example, through the equation (1), the gap workload of each node at any level of the tree may be calculated as table 1.

TABLE 1

| Gap workload for workload balancing | | | | | |
|---|---|---|---|---|---|
| Component | C | GL | GU | TU | Gap workload |
| Controller 310 | 1600 | 2600 | 61.5% | 61.5% | 0 |
| Adapter 320 | 1000 | 2000 | 50% | 61.5% | +230 |
| Adapter 330 | 600 | 600 | 100% | 61.5% | −230 |
| Disk 340 | 600 | 1000 | 60% | 61.5% | +15 |
| Disk 350 | 400 | 1000 | 40% | 61.5% | +215 |
| Disk 360 | 200 | 1000 | 66.7% | 61.5% | −15 |
| Disk 370 | 400 | 1000 | 133.3% | 61.5% | −215 |

A positive gap workload means that the component should process more workloads, while a negative gap workload means that the component should process less workloads. Moreover, based on the table 1, it is seen that disk 340 can add 15 IOPS and the disk 350 can add 215 IOPS, and the adapter 320, as their parent node, can add 230 IOPS, which is the sum of the gap workloads of the disks 340 and 350.

According to embodiments of present disclosure, the workload balance can be realized among all components in the system, instead of only among the same type of components. For example, the disk 340 has workload amount at 600 IOPS, which is greater than the workload amount of the disk 360 with a value of 200 IOPS, but the utilization rate (that is 60%) of the disk 340 is less than the utilization rate (that is 66.7%) of the disk 360. Thus, compared with the target utilization rate having a value of 61.5%, the disk 340 should carry more workloads while the disk 360 should migrate out some workloads, although the raw utilization rate of the disk 340 is greater than that of the disk 360.

Figure 8A:
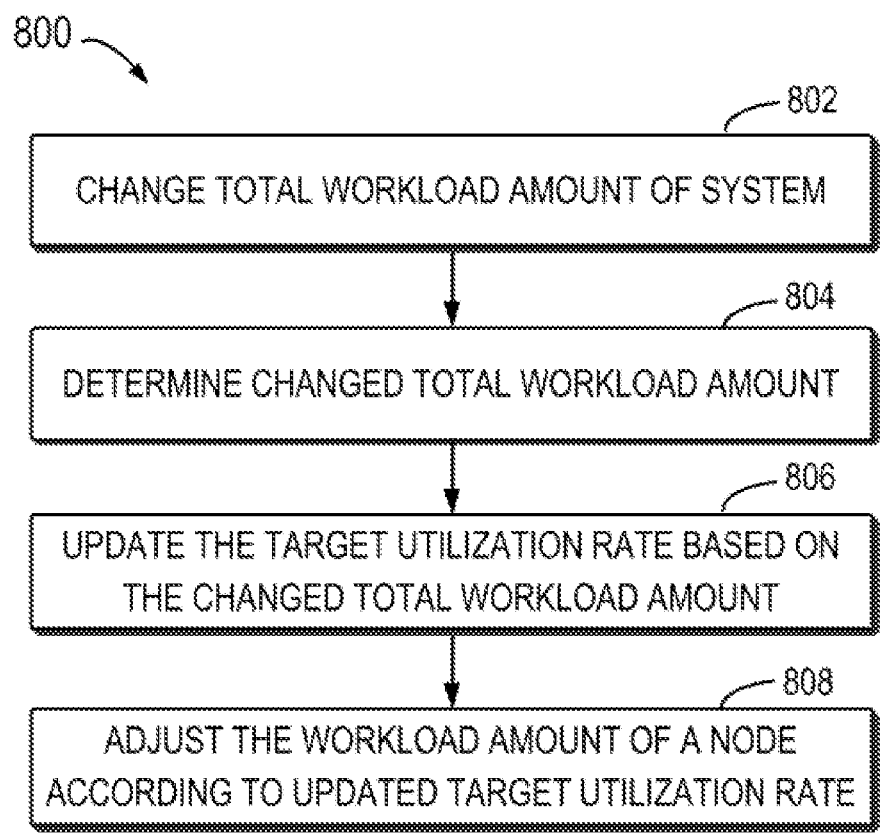
FIG. 8A is a flowchart of a method for distributing workloads in accordance with embodiments of the present disclosure.

FIG. 8A is a flowchart of a method 800 for distributing workloads in accordance with embodiments of the present disclosure. It will be understood that the method 800 may start after workload balancing in step 710 or 712 in the method 700 with respect to FIG. 7A. In the case that the system has been balanced, if a certain amount of new workloads enter into the system, it needs to determine how to distribute the workloads while maintaining the workload balance of the system.

At 802, a total workload amount of the system is changed in response to receiving a certain amount of new workloads. At 804, the changed total workload amount is determined. At 806, the target utilization rate is updated based on the changed total workload amount. For example, the changed target utilization rate may be determined to be a ratio between the changed total workload amount and the workload threshold of the root node. Then, the updated target utilization rate is determined as a sum of the current target utilization rate and the changed target utilization. At 808, a workload amount of the given node is adjusted according to the updated target utilization. According to the method 800 of the present disclosure, new workloads can be properly assigned to the nodes in the system without breaking the workload balance of the system.

Figure 8B:
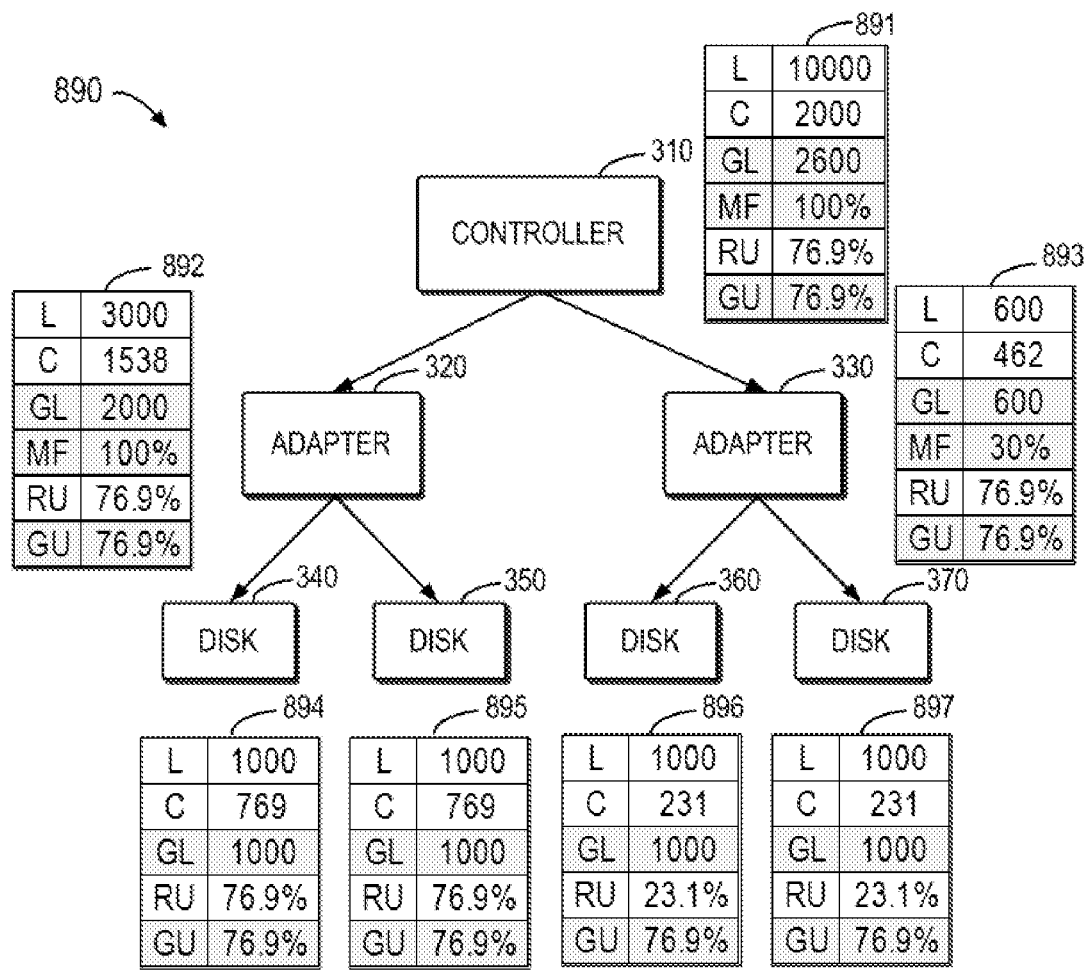
FIG. 8B is a schematic diagram illustrating the updated utilization rate of each node after workload distribution in the example storage system in accordance with embodiments of the present disclosure.

FIG. 8B is a schematic diagram 890 illustrating the updated utilization rate of each node after workload distribution in accordance with embodiments of the present disclosure. As shown in FIG. 8B, tables 891-897 show the profiles of components 310-370 respectively. For example, new workloads with 400 IOPS is assigned to the storage system 300, and then the target utilization rate of the storage system 300 is added to 76.9%. Then, the gap workload(s) for each node may be determined through the above equation (1), and the gap workload for each node may be calculated as table 2. Accordingly, the workload balance can be maintained while distributing new workloads.

TABLE 2

Gap workload for workload distribution

| Component | C | GL | GU | TU | Gap workload |
|---|---|---|---|---|---|
| Controller 310 | 1600 | 2600 | 61.5% | 76.9% | +400 |
| Adapter 320 | 1230 | 2000 | 61.5% | 76.9% | +308 |
| Adapter 330 | 370 | 600 | 61.5% | 76.9% | +92 |
| Disk 340 | 615 | 1000 | 61.5% | 76.9% | +154 |
| Disk 350 | 615 | 1000 | 61.5% | 76.9% | +154 |
| Disk 360 | 185 | 1000 | 61.5% | 76.9% | +46 |
| Disk 370 | 185 | 1000 | 61.5% | 76.9% | +46 |

In some embodiments, if the configuration of the system is changed, the workload thresholds and the modulating factors for each node are updated accordingly. Then, the utilization rate of each node may be updated based at least partially on the updated workload thresholds and the modulating factors, as discussed with respect to the methods 400-600.

Figure 9:
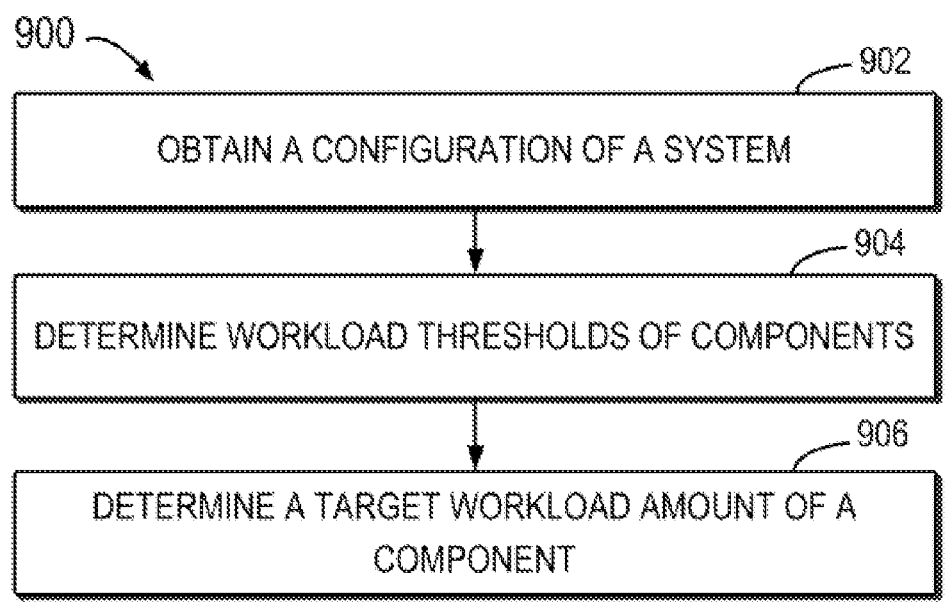
FIG. 9 is a flowchart of a method for determining a target workload amount of a component in accordance with embodiments of the present disclosure.

FIG. 9 is a flowchart of a method for determining a target workload amount of a component in accordance with embodiments of the present disclosure. At 902, a configuration of a system is obtained, wherein the configuration includes a connection relationship between components in the system. At 904, workload thresholds of the components are determined based on the configuration, the workload threshold of an upstream component of a given component is associated with a workload limit of the upstream component and a workload limit of the given component. At 906, a target workload amount of the given component is determined based at least partially on a workload amount of the system, the workload threshold of the given component, and the workload threshold of the upstream component.

For example, in the example of FIG. 4B, based on the determined workload thresholds ("GL") of each node, the target workload amount of the disk 340 may be determined as below.

$$W_4 = W*(GL_2/GL_2+GL_3)*(GL_4/GL_4+GL_5) \qquad (2)$$

Where $W_4$ denotes the target workload amount of the disk 340, W denotes the total workload amount of the storage system 300, $GL_n$ denotes the GL of the n-th component, for example, $GL_2$ denotes the GL of the adapter 320 and $GL_3$ denotes the GL of the adapter 330. According to the equation (2), the target workload amount $W_4$ of the disk 340 can be determined to be a value of 615.

In some embodiments, after determining the target workload amount of each component, the workload amount of each component may be adjusted based on current workload amount and the target workload amount. Moreover, although the method 200 and the method 1000 use different implementations, but they can have a same workload distribution result, and thus both method 200 and the method 1000 can achieve the workload balance in the overall storage system by considering the bottleneck of other components in the system. Thus, according to embodiments of the present disclosure, by considering the bottleneck of components at other levels, it is easy to detect the workload imbalance or bottleneck of the overall system, and an adjustment plan may be made in order achieve the workload balance.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, devices (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A device comprising:
a processing unit;
a memory coupled to the processing unit and storing instructions thereon, the instructions, when executed by the processing unit, performing acts including:
obtaining a configuration of a system, the configuration including a connection relationship between components in the system, the system comprising a given component that receives a workload from an upstream component;
determining a workload limit of the given component and a workload limit of the upstream component, the workload limit indicating a maximum workload of each respective component by itself;
determining a workload threshold of the given component and a workload threshold of the upstream component, the workload threshold indicating a maximum workload of each respective component when considering workload limits of components that receive workloads from the respective component;
determining a utilization rate of the given component, the utilization rate indicating what percentage of a capacity of the given component is being utilized, wherein the utilization rate is a function of the following: a current workload of the given component, the workload threshold of the given component, and the workload threshold of the upstream component; and using the utilization rate to balance workloads among the components in the system.

2. The device of claim 1, wherein the obtaining a configuration of a system comprises:

obtaining a hierarchical structure for the system in which a given node represents the given component, a parent node of the given node represents the upstream component of the given component, and a child node of the given node represents a downstream component of the given component; and obtaining the configuration of the system from the hierarchical structure.

3. The device of claim 2, wherein the determining workload thresholds of the components comprises:

for a leaf node in the hierarchical structure, determining a workload limit of the leaf node as a workload threshold of the leaf node; and for a non-leaf node in the hierarchical structure, determining a smaller value of the following two values as a workload threshold of the non-leaf node: a workload limit of the non-leaf node, and a sum of at least one workload threshold of at least one child node of the non-leaf node.

4. The device of claim 2, wherein the determining a utilization rate of the given component comprises:

determining, a ratio between the workload threshold of the parent node and a sum of at least one workload threshold of at least one child node of the parent node, as a modulating factor of the parent node, the modulating factor representing a degree that the workload threshold of the parent node impacts on the utilization rate of the given node.

5. The device of claim 4, wherein the determining a utilization rate of the given component further comprises:

determining the utilization rate of the given node based at least partially on the workload amount of the given node, the workload threshold of the given node, and the modulating factor of the parent node.

6. The device of claim 1, wherein the determining a utilization rate of the given component comprises:

determining a utilization rate of a root component as a target utilization rate of the system.

7. The device of claim 6, wherein the acts further comprise:

in response to determining that the utilization rate of the given component is different from the target utilization rate, determining a gap value between the utilization rate and the target utilization rate;

determining a gap workload of the given component based on the gap value; and adjusting the workload amount of the given component according to the gap workload.

8. The device of claim 7, wherein the acts further comprise:

in response to changing a total workload amount of the system, determining the changed total workload amount;

updating the target utilization rate based on the changed total workload amount; and adjusting the workload amount of the given component according to the updated target utilization.

9. The device of claim 1, wherein the acts further comprise:

in response to changing the configuration of the system, updating the workload thresholds of the components based on the changed configuration;

determining the updated utilization rate of the given component based at least partially on the updated workload thresholds of the components.

10. The device of claim 1, wherein the system is a storage system, and the components include a disk and a controller, and the workload is input/output operations per second (IOPS).

11. A computer-implemented method comprising:

obtaining a configuration of a system, the configuration including a connection relationship between components in the system, the system comprising a given component that receives a workload from an upstream component;

determining a workload limit of the given component and a workload limit of the upstream component, the workload limit indicating a maximum workload of each respective component by itself;

determining a workload threshold of the given component and a workload threshold of the upstream component, the workload threshold indicating a maximum workload of each respective component when considering workload limits of components that receive workloads from the respective component;

determining a utilization rate of the given component, the utilization rate indicating what percentage of a capacity of the given component is being utilized, wherein the utilization rate is a function of the following: a current workload of the given component, the workload threshold of the given component, and the workload threshold of the upstream component; and using the utilization rate to balance workloads among the components in the system.

12. The method of claim 11, wherein the obtaining a configuration of a system comprises:

obtaining a hierarchical structure for the system in which a given node represents the given component, a parent node of the given node represents the upstream component of the given component, and a child node of the given node represents a downstream component of the given component; and obtaining the configuration of the system from the hierarchical structure.

13. The method of claim 12, wherein the determining workload thresholds of the components comprises:

for a leaf node in the hierarchical structure, determining a workload limit of the leaf node as a workload threshold of the leaf node; and for a non-leaf node in the hierarchical structure, determining a smaller value of the following two values as a workload threshold of the non-leaf node: a workload limit of the non-leaf node, and a sum of at least one workload threshold of at least one child node of the non-leaf node.

14. The method of claim 12, wherein the determining a utilization rate of the given component comprises:

determining, a ratio between the workload threshold of the parent node and a sum of at least one workload threshold of at least one child node of the parent node, as a modulating factor of the parent node, the modulating factor representing a degree that the workload threshold of the parent node impacts on the utilization rate of the given node.

15. The method of claim 14, wherein the determining a utilization rate of the given component further comprises:

determining the utilization rate of the given node based at least partially on the workload amount of the given node, the workload threshold of the given node, and the modulating factor of the parent node.

16. The method of claim 11, wherein the determining a utilization rate of the given component comprises:
determining a utilization rate of a root component as a target utilization rate of the system.

17. The method of claim 16, further comprising:
in response to determining that the utilization rate of the given component is different from the target utilization rate, determining a gap value between the utilization rate and the target utilization rate;
determining a gap workload of the given component based on the gap value; and
adjusting the workload amount of the given component according to the gap workload.

18. The method of claim 17, further comprising:
in response to changing a total workload amount of the system, determining the changed total workload amount;
updating the target utilization rate based on the changed total workload amount; and
adjusting the workload amount of the given component according to the updated target utilization.

19. The method of claim 1, wherein the system is a storage system, and the components include a disk and a controller, and the workload is input/output operations per second (IOPS).

20. A computer program product stored on a non-transitory machine-readable medium and comprising machine-executable instructions, the instructions, when executed on a device, causing the device to:
obtain a configuration of a system, the configuration including a connection relationship between components in the system, the system comprising a given component that receives a workload from an upstream component;
determine a workload limit of the given component and a workload limit of the upstream component, the workload limit indicating a maximum workload of each respective component by itself;
determine a workload threshold of the given component and a workload threshold of the upstream component, the workload threshold indicating a maximum workload of each respective component when considering workload limits of components that receive workloads from the respective component;
determine a utilization rate of the given component, the utilization rate indicating what percentage of a capacity of the given component is being utilized, wherein the utilization rate is a function of the following: a current workload of the given component, the workload threshold of the given component, and the workload threshold of the upstream component; and
use the utilization rate to balance workloads among the components in the system.

* * * * *